(12) United States Patent
Wang et al.

(10) Patent No.: US 10,991,963 B2
(45) Date of Patent: Apr. 27, 2021

(54) FUEL CELL SYSTEM AND CONTROL METHOD THEREOF

(71) Applicant: Cummins Enterprise LLC, Indianapolis, IN (US)

(72) Inventors: Honggang Wang, Clifton Park, NY (US); Andrew Philip Shapiro, Schenectady, NY (US)

(73) Assignee: CUMMINS ENTERPRISE LLC, Indianapolis, IN (US)

( * ) Notice: Subject to any disclaimer, the term of this patent is extended or adjusted under 35 U.S.C. 154(b) by 285 days.

(21) Appl. No.: 16/030,908

(22) Filed: Jul. 10, 2018

(65) Prior Publication Data
US 2020/0020965 A1 Jan. 16, 2020

(51) Int. Cl.
  H01M 8/04955 (2016.01)
  H01M 8/04089 (2016.01)
  H01M 8/04746 (2016.01)
  H01M 8/0612 (2016.01)
  H01M 8/04014 (2016.01)
  (Continued)

(52) U.S. Cl.
  CPC .......... *H01M 8/04955* (2013.01); *C01B 3/34* (2013.01); *H01M 8/04022* (2013.01); *H01M 8/04089* (2013.01); *H01M 8/04303* (2016.02); *H01M 8/04686* (2013.01); *H01M 8/04783* (2013.01); *H01M 8/0618* (2013.01); *C01B 2203/0205* (2013.01); *C01B 2203/066* (2013.01); *C01B 2203/1241* (2013.01)

(58) Field of Classification Search
  CPC ......... H01M 8/04955; H01M 8/04303; H01M 8/04022; H01M 8/04089; H01M 8/04686; H01M 8/04783; H01M 8/0618; C01B 3/34; C01B 2203/0205; C01B 2203/066; C01B 2203/1241

USPC ........................................................ 429/414
See application file for complete search history.

(56) References Cited

U.S. PATENT DOCUMENTS 5,059,494 A * 10/1991 Vartanian .......... H01M 8/04104
  429/415
6,077,620 A * 6/2000 Pettit ...................... B01J 8/0438
  429/425

(Continued)

OTHER PUBLICATIONS

International Search Report and Opinion issued in connection with corresponding PCT No. US 19/40801 dated Nov. 5, 2019.

*Primary Examiner* — Jonathan G Jelsma
*Assistant Examiner* — Omar M Kekia
(74) *Attorney, Agent, or Firm* — Barnes & Thornburg LLP

(57) ABSTRACT

A fuel cell system and a control method thereof are disclosed. The system includes a fuel cell stack having an anode and a cathode, an anode recirculation loop including the anode, a fuel supply device for providing a fuel gas via a fuel feed path, an air supply device for providing air to the cathode, an anode blower and a switching element. The loop has a first path and a second path, and the anode is arranged in the second path. During normal operation of the system, the fuel feed path and the first path are combined to form the second path, and the second path is split into the first path and a fuel exhaust path. The anode blower is configured for driving circulation through the loop. The switching element is located in at least one of the first path and the combining point and is configured to force the fuel gas to flow through the second path to the fuel exhaust path in the event of failure of the anode blower.

18 Claims, 7 Drawing Sheets

(51) Int. Cl.
   *C01B 3/34*      (2006.01)
   *H01M 8/04303*   (2016.01)
   *H01M 8/04664*   (2016.01)

(56)            References Cited

U.S. PATENT DOCUMENTS

| | | |
|---|---|---|
| 2006/0286420 A1 | 12/2006 | Koyama et al. |
| 2008/0038595 A1* | 2/2008 | Buchi .................... B60L 58/33 |
| | | 429/429 |
| 2009/0014149 A1 | 1/2009 | Noh et al. |
| 2009/0181270 A1 | 7/2009 | Kamara et al. |
| 2009/0280366 A1* | 11/2009 | Baaser .............. H01M 8/04753 |
| | | 429/410 |
| 2014/0170513 A1 | 6/2014 | Li et al. |
| 2014/0315110 A1* | 10/2014 | Blank ............... H01M 8/04097 |
| | | 429/414 |
| 2015/0357663 A1 | 12/2015 | Ramaswamy et al. |
| 2017/0040620 A1* | 2/2017 | Uwani ................. H01M 8/242 |
| 2017/0040628 A1* | 2/2017 | Strom ............... H01M 8/04731 |
| 2017/0346118 A1 | 11/2017 | Wang et al. |
| 2018/0145351 A1* | 5/2018 | Wang ............... H01M 8/04843 |
| 2018/0375121 A1* | 12/2018 | Jahnke ............. H01M 8/04783 |

* cited by examiner

FUEL CELL SYSTEM AND CONTROL METHOD THEREOF

BACKGROUND

This disclosure relates generally to the field of fuel cells, and more particularly to a fuel cell system with anode protection and a method for controlling the fuel cell system.

Fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems are being widely developed as an energy supply system because fuel cells are environmentally superior and highly efficient. To improve system efficiency and fuel utilization and reduce external water usage, the fuel cell system usually includes an anode recirculation loop. As single fuel cell can only generate voltages of about 1V, therefore, a plurality of fuel cells are usually stacked together (usually referred to as a fuel cell stack) to get a desired voltage.

The fuel is supplied to the anode recirculation loop. The anode recirculation loop includes an anode blower path and an anode path. An anode blower is arrange in the anode blower path and an anode of the fuel cell stack is arranged in the anode path. The anode path is split into the anode blower path and a fuel exhaust path at a splitting point. The anode blower is used to provide a driving force for the anode recirculation loop.

An anode of a typical solid oxide fuel cell (SOFC) is commonly made of a nickel (Ni) cermet. Nickel in the anode serves as a catalyst for fuel oxidation and current conductor. During normal operation of the fuel cell system, SOFC stacks are typically operated at above 700° C. and the nickel (Ni) in the anode remains in its reduced form due to the continuous supply of primarily hydrogen fuel gas.

However, when any failure or abnormal event occurs on the anode blower, the anode recirculation loop would break. The purge gas supplied (usually using a mixture of the fuel and steam) can escape from the anode blower path instead of the anode path, which could not guarantee the required reducing gas passing through the fuel cell stack.

Furthermore, After the loss of anode recirculation, a reformer in the anode recirculation loop could not recover heat from an anode exhaust anymore. The reformer may cool down faster than the anode due to the endothermic steam reforming reaction by using the mixture of the fuel and steam as the purge gas. After the reformer inlet temperature drops below a certain value, which could be in the range of 400° C. to 650° C. depending on the catalyst used, the steam reforming reaction stops. Then, no $H_2$ rich reducing gas is available for the anode.

When the anode is subject to lack of reducing gas atmosphere, the Ni in the anode may undergo a re-oxidation, where the Ni may react with the oxygen in the air diffused from the cathode layer or introduced into the anode chamber to form nickel oxide (NiO) at temperatures above approximately 350° C. The formation of NiO in the microstructure of the anode may result in volumetric expansion of the anode layer, which exerts stress on the overall SOFC structure. During rapid oxidation, the electrolyte is unable to expand as fast as the forming nickel oxide, resulting in the potential to crack the electrolyte. The integrity of the fuel cell stack would be compromised.

BRIEF DESCRIPTION

In one aspect of embodiments of the present disclosure, a fuel cell system is provided. The fuel cell system comprises a fuel cell stack configured for generating power and having an anode and a cathode, an anode recirculation loop comprising the anode, a fuel supply device for providing a fuel gas via a fuel feed path, an air supply device for providing air to the cathode of the fuel cell stack via an air feed path, an anode blower and a switching element. The anode recirculation loop has a first path and a second path, and the anode is arranged in the second path. During normal operation of the fuel cell system, the fuel feed path and the first path are combined at a combining point to form the second path, and the second path is split into the first path and a fuel exhaust path at a splitting point. The anode blower is located in the anode recirculation loop and is configured for driving circulation through the anode recirculation loop. The switching element is located in at least one of the first path and the combining point, and is configured to force the fuel gas to flow through the second path to the fuel exhaust path in the event of failure of the anode blower.

In another aspect of embodiments of the present disclosure, a method for controlling a fuel cell system is provided. The fuel cell system comprises a fuel cell stack configured for generating power and having an anode and a cathode, and an anode recirculation loop comprising the anode. The method comprises supplying a fuel gas to the anode recirculation loop by driving of an anode blower; supplying air to the cathode of the fuel cell stack; monitoring health status of the anode blower; initiating a shutdown procedure of the fuel cell system when a signal of failure of the anode blower is received; and forcing the fuel gas to flow through the anode to a fuel exhaust path.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including", "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. In addition, Terms indicating specific locations, such as "top", "bottom", "left", and "right", are descriptions with reference to specific accompanying drawings. Embodiments disclosed in the present disclosure may be placed in a manner different from that shown in the figures. Therefore, the location terms used herein should not be limited to locations described in specific embodiments.

Fuel Cell System with Anode Recirculation Loop

Figure 1:
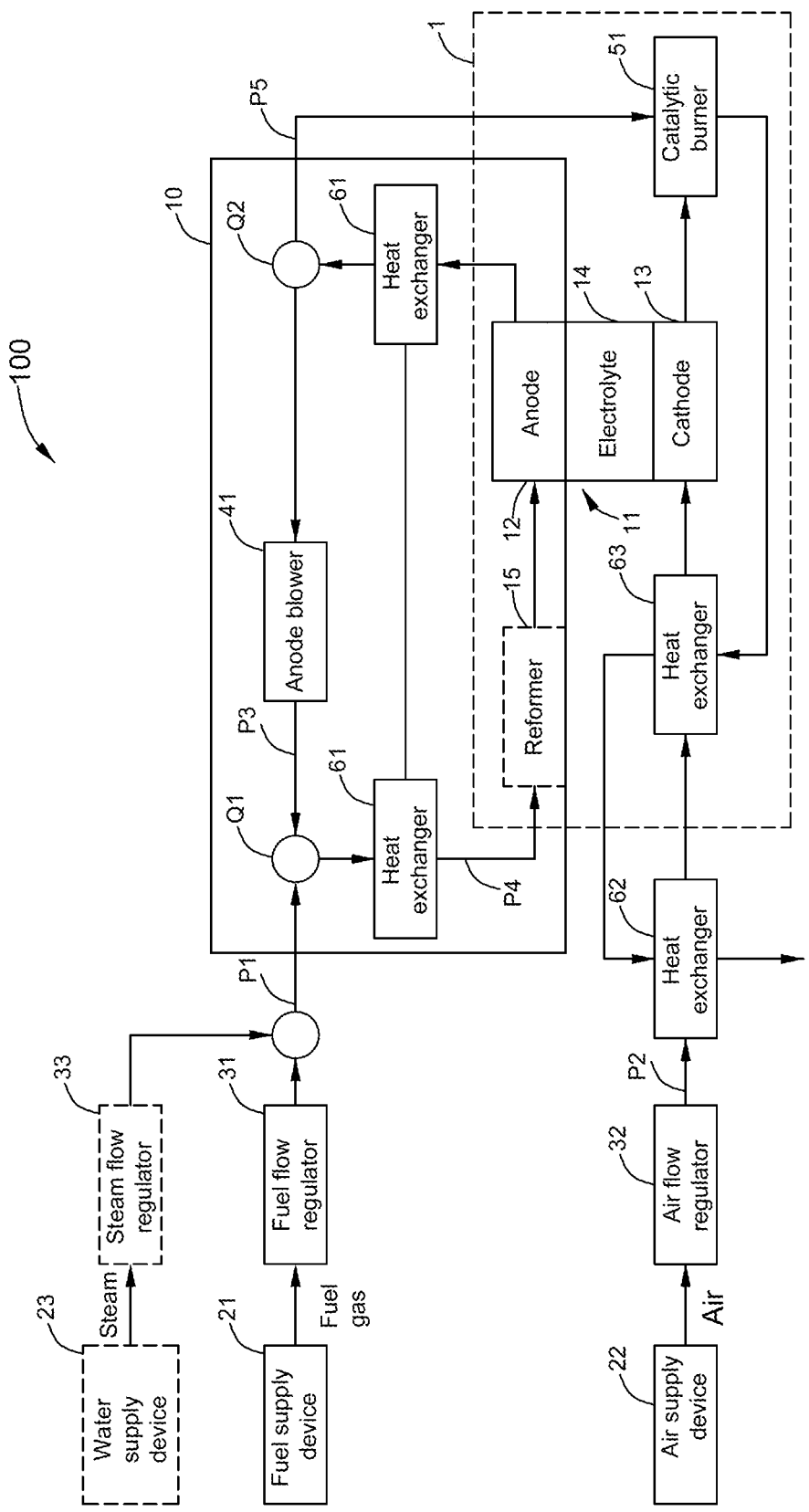
FIG. 1 is a schematic block diagram of an exemplary fuel cell system with an anode recirculation loop.

FIG. 1 illustrates a schematic block diagram of an exemplary fuel cell system 100. As shown in FIG. 1, the exemplary fuel cell system 100 includes a fuel cell stack 11 for generating power. The fuel cell stack 11 may include a plurality of fuel cells which are stacked together. The fuel cells may for example include, but are not limited to solid oxide fuel cells (SOFCs). In fact, the fuel cells may be any fuel cell using nickel-based material as anode material.

The fuel cell stack 11 includes an anode 12, a cathode 13, and an electrolyte 14. The fuel cell system 100 may have an anode recirculation loop 10 including the anode 12 of the fuel cell stack 11. The anode 12 of the fuel cell stack 11 has an anode inlet and an anode outlet. The cathode 13 of the fuel cell stack 11 has a cathode inlet and a cathode outlet.

The anode 12 may support electrochemical reactions that generate electricity. A fuel gas may be oxidized in the anode 12 with oxygen ions received from the cathode 13 via diffusion through the electrolyte 14. The reactions may create heat, steam and electricity in the form of free electrons in the anode 12, which may be used to supply power to a power load (not shown). The oxygen ions may be created via an oxygen reduction of a cathode oxidant using the electrons returning from the power load into the cathode 13.

The cathode 13 may be coupled to a source of the cathode oxidant, such as oxygen in the atmospheric air. The cathode oxidant is defined as the oxidant that is supplied to the cathode 13 employed by the fuel cell system 100 in generating electrical power. The cathode 13 may be permeable to the oxygen ions received from the cathode oxidant.

The electrolyte 14 may be in communication with the anode 12 and the cathode 13. The electrolyte 14 may pass the oxygen ions from the cathode 13 to the anode 12, and may have little or no electrical conductivity, so as to prevent passage of the free electrons from the cathode 13 to the anode 12.

With continued reference to FIG. 1, the fuel cell system 100 include a fuel supply device 21 and an air supply device 22. The fuel supply device 21 may provide a fuel gas via a fuel feed path P1 to the anode recirculation loop 10. The fuel gas may include for example natural gas (NG). The air supply device 22 may provide air via an air feed path P2 to the cathode 13 of the fuel cell stack 11.

The fuel cell system 100 includes an anode blower 41 for driving circulation through the anode recirculation loop 10. The anode recirculation loop 10 has a first path P3 and a second path P4. The anode 12 is arranged in the second path P4. The anode blower 41 may be located in the anode recirculation loop 10. For example, the anode blower 41 is located in the first path P3 as shown in FIG. 1. Alternatively, the anode blower 41 may be also located in the second path P4. During normal operation of the fuel cell system 100, the fuel feed path P1 and the first path P3 are combined at a combining point Q1 to form the second path P4, and the second path P4 is split into the first path P3 and a fuel exhaust path P5 at a splitting point Q2.

The fuel cell system 100 may further include a fuel flow regulator 31 and an air flow regulator 32. The fuel flow regulator 31 may regulate a fuel flowrate of the fuel gas provided to the anode recirculation loop 10. The air flow regulator 32 may regulate an air flowrate of the air provided to the cathode 13 of the fuel cell stack 11.

Optionally, the fuel cell system 100 may further include a water supply device 23 and a steam flow regulator 33. The water supply device 23 may feed steam for fuel reforming to the fuel feed path P1 and further to the anode recirculation loop 10. The steam flow regulator 33 may regulate a steam flowrate of the steam fed to the fuel feed path P1.

In one embodiment, as shown in FIG. 1, the anode recirculation loop 10 may further include a reformer 15. The reformer 15 is located in the second path P4 and upstream from the anode 12. The reformer 15 has a reformer inlet and a reformer outlet. The reformer outlet of the reformer 15 is coupled to the anode inlet of the anode 12, and the anode outlet of the anode 12 may be returned to the reformer inlet of the reformer 15 so as to form the anode recirculation loop 10.

When the fuel cell system 100 is in operation, the fuel gas, for example natural gas is supplied to the anode recirculation loop 10, particularly the reformer inlet of the reformer 15 in this embodiment, and the air, is supplied to the cathode 13 of the fuel cell stack 11. In the reformer 15, the fuel gas may be reformed to generate a hydrogen ($H_2$) rich reformate at the reformer outlet. For example, methane ($CH_4$) contained in the natural gas is converted into carbon monoxide (CO) and hydrogen ($H_2$) by the following fuel reforming reaction (1). The fuel reforming reaction may absorb a lot of heat.

$$CH_4 + H_2O \rightarrow CO + 3H_2 \quad (1)$$

The hydrogen rich reformate enters to the anode inlet of the fuel cell stack 11. In the anode 12 of the fuel cell stack 11, the hydrogen rich reformate and the oxygen ions from the cathode 13 are mixed, and are converted into steam through the following electro-chemical reaction (2) so as to generate power and release a lot of heat.

$$2H_2O^{2-} \rightarrow 2H_2O \quad (2)$$

In another embodiment, the fuel cell stack 11 may have internal reforming function without the separate reformer 15. Under such the circumstance, the anode outlet of the fuel cell stack 11 may be directly returned to the anode inlet so as to form the anode recirculation loop 10. Thus, both the fuel reforming reaction (1) and the electro-chemical reaction (2) will occur in the anode 12 of the fuel cell stack 11.

The fuel cell system 100 includes a catalytic burner 51. A fuel exhaust from the anode outlet and an air exhaust from the cathode outlet may be combusted in the catalytic burner 51.

The fuel cell system 100 includes a fuel heat exchanger 61, a first air heat exchanger 62 and a second air heat exchanger 63. The fuel heat exchanger 61 is located in the second path P4 of the anode recirculation loop 10, and the fuel heat exchanger 61 may transfer heat of the fuel exhaust from the anode outlet to the warm fuel gas provided by the fuel supply device 21. The first air heat exchanger 62 and the second air heat exchanger 63 are sequentially located in the air feed path P2. The first air heat exchanger 62 may transfer heat of a gas from an outlet of the second air heat exchanger 63 to the cold air provided by the air supply device 22, and the second air heat exchanger 63 may transfer heat of a high-temperature burner exhaust from the catalytic burner 51 to a warm air from an outlet of the first air heat exchanger 62.

The fuel cell stack 11, the reformer 15, the catalytic burner 51 and the second air heat exchanger 63 are sealed in a hotbox 1. The inside of the hotbox 1 is at a high-temperature circumstance.

Fuel Cell System with Anode Protection

Figure 2:
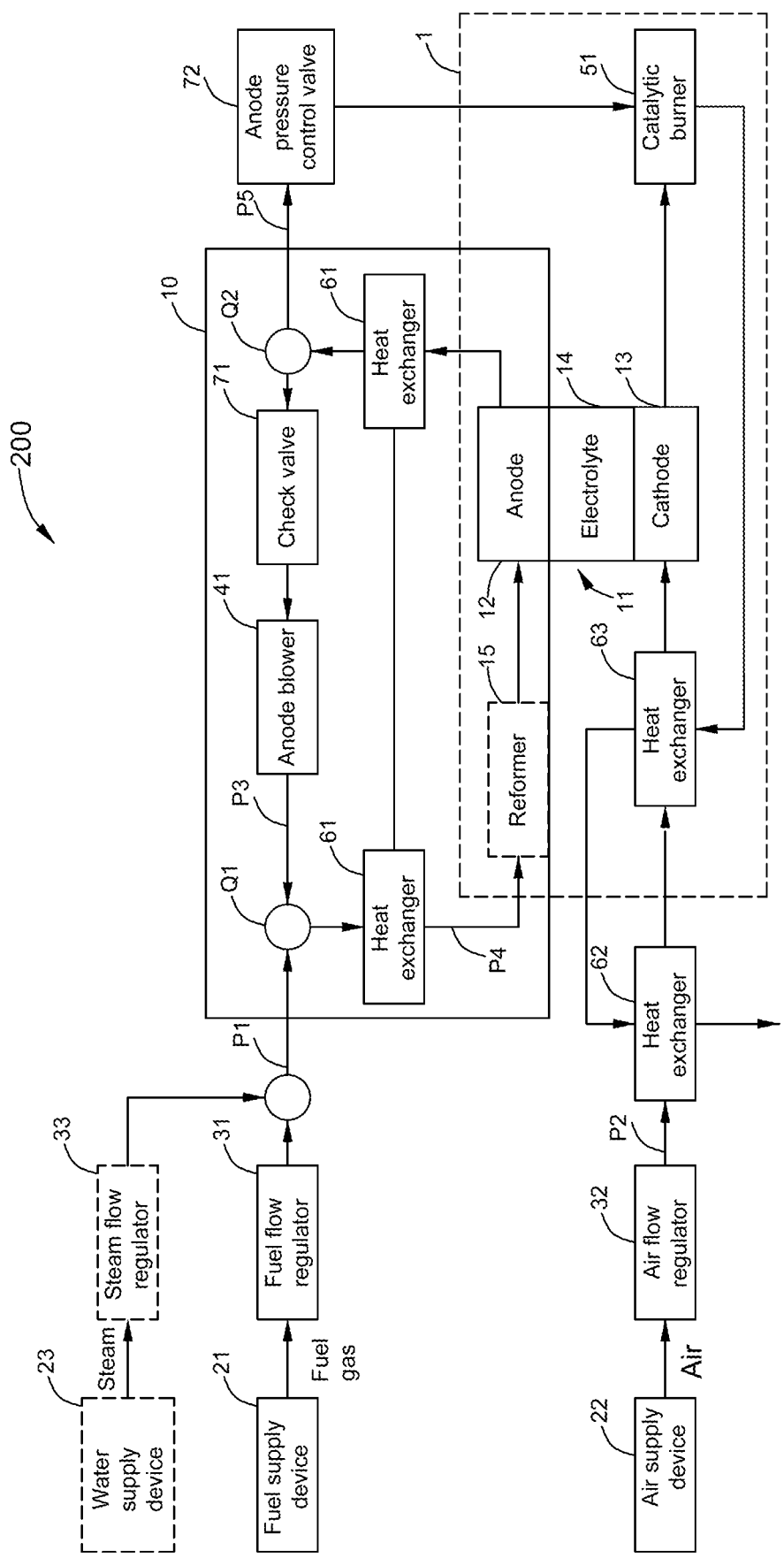
FIG. 2 is a schematic block diagram of a fuel cell system with anode protection in accordance with an embodiment of the present disclosure.

FIG. 2 illustrates a schematic block diagram of a fuel cell system 200 with anode protection in accordance with an embodiment of the present disclosure. In comparison to the fuel cell system 100 of FIG. 1, the fuel cell system 200 in accordance with an embodiment of the present disclosure may further include a switching element. The switching element may be located in at least one of the first path P3 and the combining point Q1. As shown in FIG. 2, in one embodiment, the switching element may include a check valve 71. In another embodiment, the switching element may include a solenoid valve. In still another embodiment, the switching element may include a combination of the check valve 71 and the solenoid valve connected in series. In yet another embodiment, the switching element may also include a fail-safe three-way valve. Hereinafter, the check valve 71 is taken as an example of the switching element for purpose of description. In the figures of the present disclosure, the check valve 71 is shown to be located in the first path P3 of the anode recirculation loop 10. The check valve 71 may force the fuel gas to flow through the second path P4 to the fuel exhaust path P5 in the event of failure of the anode blower 41. Failure of the anode blower 41 means the anode blower 41 won't be able to drive circulation through the anode recirculation loop 10 any more. When a signal of failure of the anode blower is received, the check valve 71 is triggered off and the first path P3 is broken. At this time, the fuel gas may be ensured to flow through the second path P4 instead of the first path P3 to the fuel exhaust path P5, and the fuel gas is reduced to a reducing gas. Thus, adequate reducing gas may be ensured to flow through the anode 12 of the fuel cell stack 11 with a minimal amount. When the temperature is above 500° C. the anode 12 may be kept in a reduced atmosphere so as to prevent the re-oxidation of the Ni. When the switching element is a fail-safe three-way valve, the switching element may be located at the combining point Q1, which may force the fuel gas to flow into the second path P4 instead of the first path P3.

In comparison to the fuel cell system 100 of FIG. 1, the fuel cell system 200 in accordance with an embodiment of the present disclosure may further include a pressure control device for maintaining an anode pressure higher than a cathode pressure when the fuel cell system 200 is shut down. With continued reference to FIG. 2, the pressure control device according to one embodiment of the present disclosure may include an anode pressure control valve 72. The anode pressure control valve 72 may regulate the anode pressure separately so as to maintain the anode pressure higher than the cathode pressure when the fuel cell system 200 is shut down process, which may prevent cross-over leakage of air from the cathode 13 to the anode 12 which could oxidize the anode material. In one embodiment, the anode pressure control valve 72 is located between the splitting point Q2 and the catalytic burner 51. In another embodiment, the anode pressure control valve 72 is located after the splitting point Q2 and before the hotbox 1.

Figure 3:
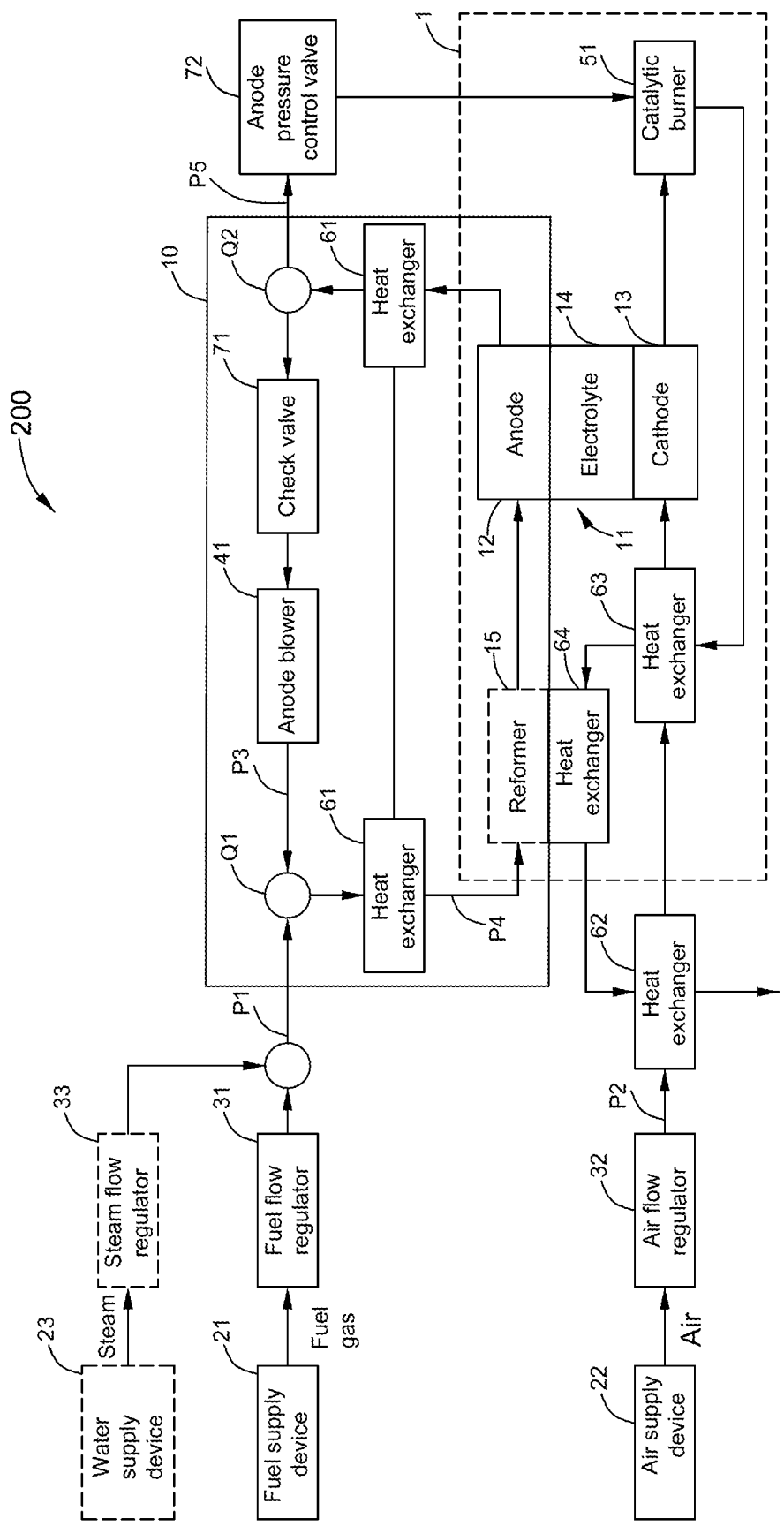
FIG. 3 is a schematic block diagram of a fuel cell system with anode protection in accordance with another embodiment of the present disclosure.

As shown in FIG. 3, the fuel cell system 200 may further include an anode heat exchanger 64 arranged near the reformer 15. The catalytic burner 51 can maintain the reformer 15 above an active reforming reaction temperature (for example 500-650° C.) which can provide continuous reducing gas ($H_2$/CO) for anode reduction purpose. A high-temperature burner exhaust from the catalytic burner 51 may flow through the anode heat exchanger 64, and the anode heat exchanger 64 may transfer heat of the high-temperature burner exhaust to the reformer 15.

In the embodiment with the anode heat exchanger 64, the high temperature gas whose heat is transferred by the first air heat exchanger 62 to the cold air provided by the air supply device 22 is a gas from an outlet of the anode heat exchanger 64.

The fuel cell stack 11, the reformer 15, the catalytic burner 51, the second air heat exchanger 63 and the anode heat exchanger 64 are all sealed in the hotbox 1.

As an example, as shown in FIG. 3, the warm fuel gas at about 200° C. supplied by the fuel supply device 21 passes through the fuel heat exchanger 61. In the fuel heat exchanger 61, the warm fuel gas at about 200° C. recovers the heat from the anode exhaust at about 750~800° C. from the anode outlet. After the fuel heat exchanger 61, the fuel gas exiting from an outlet of the fuel heat exchanger 61 and entering the reformer inlet may reach about 680~750° C.

The cold air at about 25° C. supplied by the air supply device 22 passes through the first air heat exchanger 62. In the first air heat exchanger 62, the cold air at about 25° C. exchanges heat with a gas at about 450° C. from the outlet of the anode heat exchanger 64. After the first air heat exchanger 62, a warm air from an outlet of the first air heat exchanger 62 may reach about 300° C. and then enters the hotbox 1. After pre-heating of the hotbox 1, the warmer air entering an inlet of the second air heat exchanger 63 may reach about 400° C. In the second air heat exchanger 63, the warmer air at about 400° C. is further heat-exchanged with the high-temperature burner exhaust at about 850° C. from the catalytic burner 51. After the second air heat exchanger 63, a hot air exiting from an outlet of the second air heat exchanger 63 and entering the cathode inlet may reach about 700° C. and the burner exhaust exiting from the second air heat exchanger 63 and entering the anode heat exchanger 64 is about 700° C. In the anode heat exchanger 64, the anode heat exchanger 64 may transfer heat of the burner exhaust at about 700° C. to the reformer 15. After the anode heat exchanger 64, the burner exhaust exiting from the outlet of the anode heat exchanger 64 and entering the first air heat exchanger 62 may reach about 450° C. After the first air heat exchanger 62, the burner exhaust discharged from the first air heat exchanger 62 is about 150-200° C.

Figure 4:
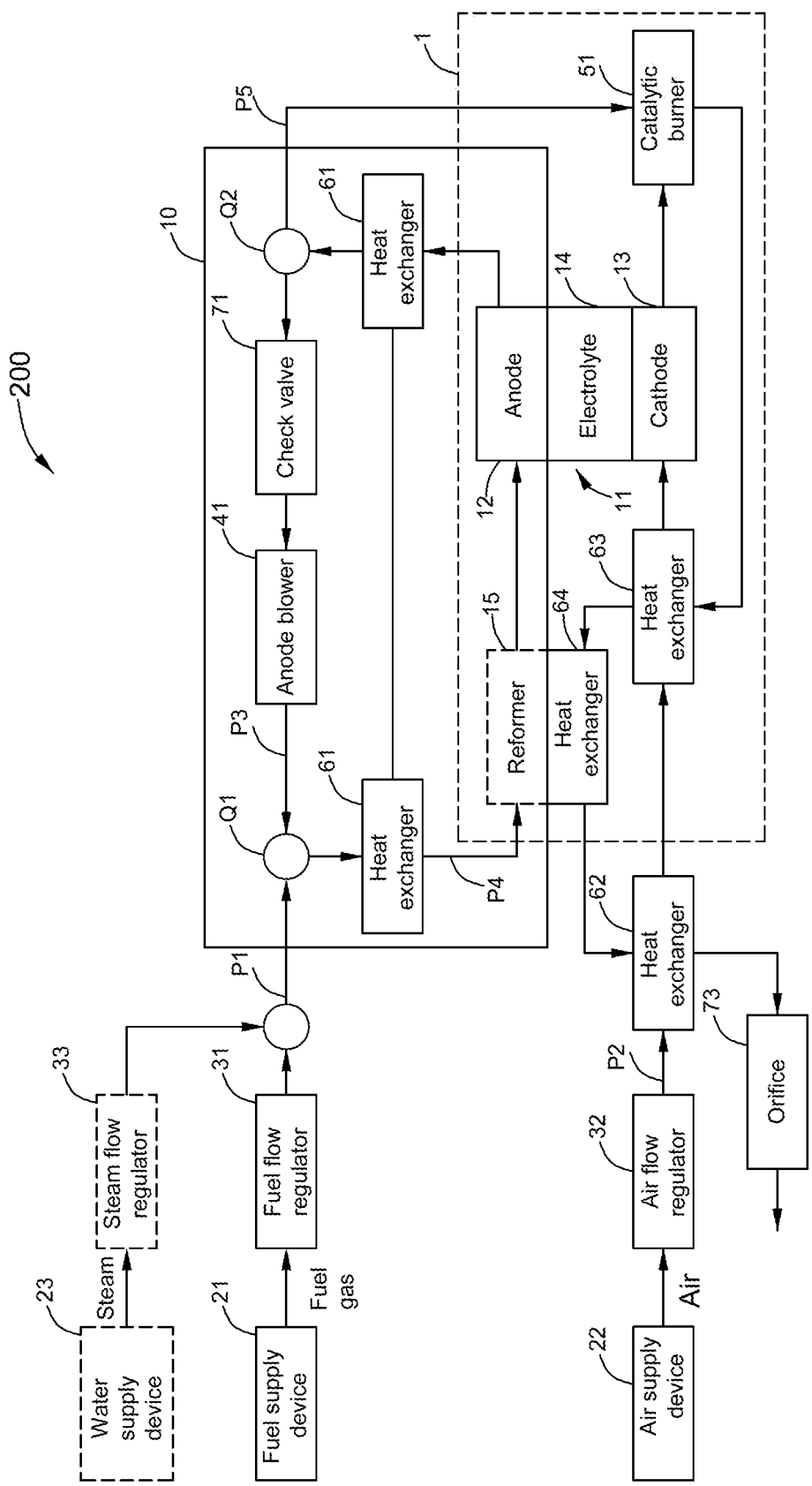
FIG. 4 is a schematic block diagram of a fuel cell system with anode protection in accordance with still another embodiment of the present disclosure.

As shown in FIG. 4, the pressure control device according to another embodiment of the present disclosure may include an orifice 73. In one embodiment, the orifice 73 is located downstream from the splitting point Q2. In another embodiment, the orifice 73 is located downstream from the first air heat exchanger 62.

In the fuel cell system 200 of embodiments of the present disclosure, by arranging the switching element such as the check valve 71 and the pressure control device, the fuel cell system 200 of the present disclosure may effectively protect the anode 12 of the fuel cell stack 11 from oxidation and prevent cross-over leakage of the fuel cell stack 11 in the event of failure of the anode blower 41, and may thus protect the integrity of the fuel cell stack 11.

Without using any additional gas supply such as ammonia based reducing gas or hydrogen cylinders to prevent re-oxidation of the nickel in the anode 12, the fuel cell system 200 of the present disclosure may only use the existing fuel supply device 21 which is used in normal operation of the fuel cell stack 11. The fuel cell system 200 of the present disclosure may be economical to install and operate.

Method for Controlling Fuel Cell System

Figure 5:
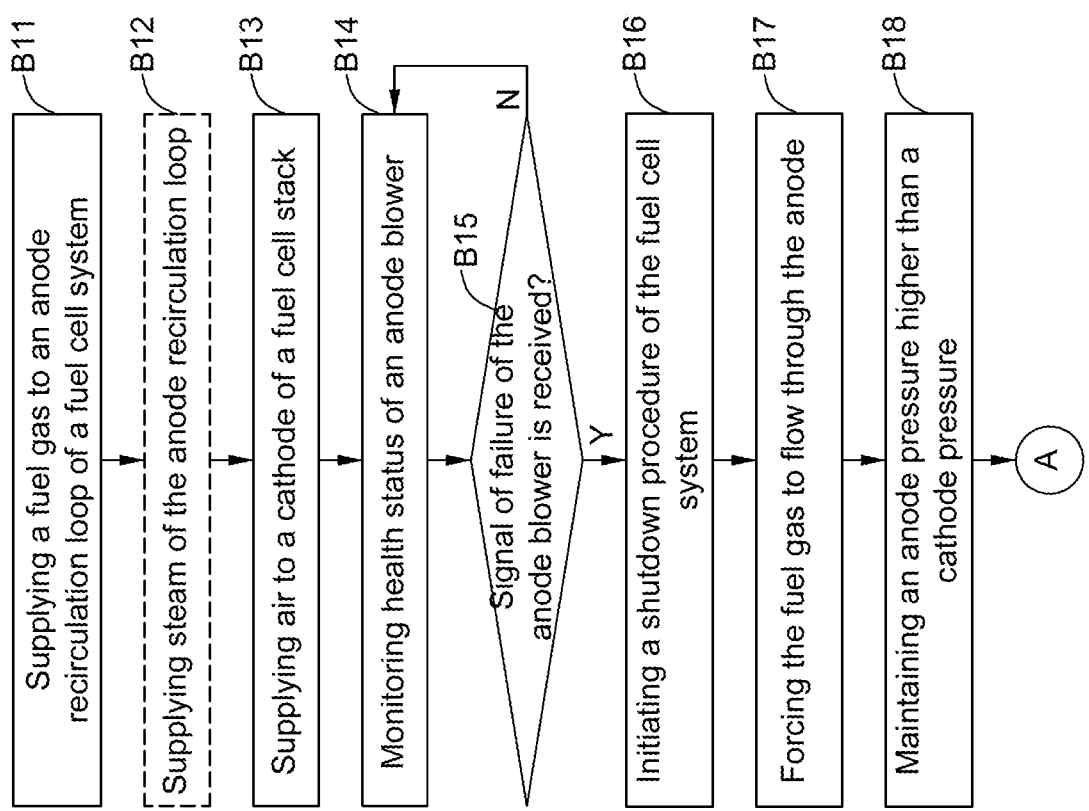
FIG. 5 is a flow chart of the former part of an exemplary method for controlling a fuel cell system in accordance with an embodiment of the present disclosure.

FIG. 5 illustrates a flow chart of the former part of an exemplary method for controlling a fuel cell system in accordance with an embodiment of the present disclosure. The control method may include the following steps.

As shown in FIG. 5, in block B11, a fuel gas may be supplied by a fuel supply device 21 to an anode recirculation loop 10 of the fuel cell system by driving of an anode blower 41.

In an optional embodiment, the control method may further include optional step B12. In block B12, steam may be supplied by a water supply device 23 to the anode recirculation loop 10.

In block B13, air may be supplied by an air supply device 22 to the cathode of the fuel cell stack 11.

In block B14, health status of the anode blower 41 may be monitored by a sensor.

In block B15, it is determined whether any failure or abnormal event occurs to the anode blower 41. When a signal of failure of the anode blower 41 is received, the process continues to block B16. Otherwise, the process returns to block B14.

In block B16, when the signal of failure of the anode blower 41 is received, a shutdown procedure of the fuel cell system 200 may be initiated.

Figure 6:
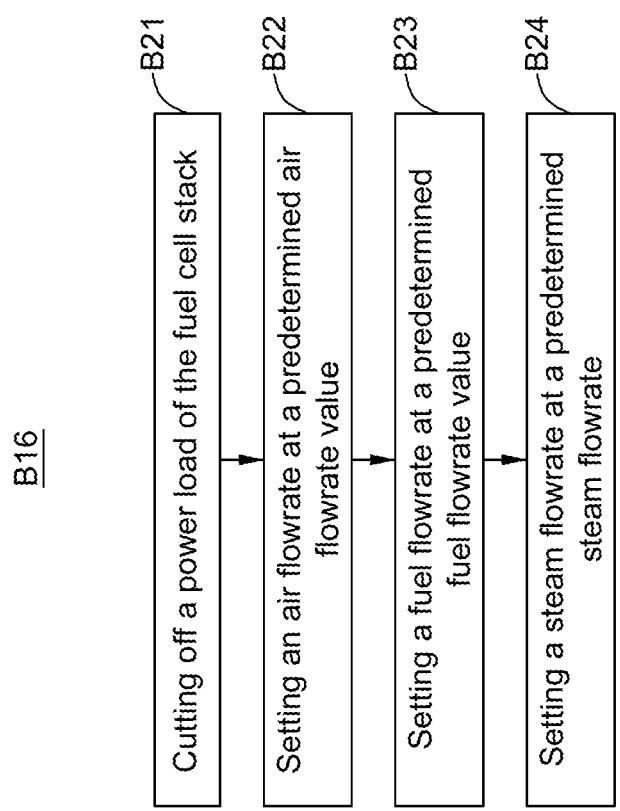
FIG. 6 is a flow chart illustrating how to initiate a shutdown procedure of a fuel cell stack in FIG. 5 in accordance with an embodiment of the present disclosure.

FIG. 6 illustrates how to initiate the shutdown procedure of a fuel cell stack 11 in FIG. 5 in accordance with an embodiment of the present disclosure. Initiating the shutdown procedure of the fuel cell system 200 may include the following steps.

In block B21 of FIG. 6, a power load of the fuel cell stack 11 is cut off.

In block B22, an air flowrate of the air provided to the cathode 13 of the fuel cell stack 11 is set at a predetermined air flowrate value.

In block B23, a fuel flowrate of the fuel gas provided to the anode recirculation loop 10 is set at a predetermined fuel flowrate value.

In block B24, a steam flowrate of the steam provided to the anode recirculation loop 10 is set a predetermined steam flowrate. The purpose of blocks B23 and B24 can ensure a steam to carbon ratio (SCR) in the anode recirculation loop 10 above a predetermined steam to carbon ratio limit to avoid carbon deposition. For example, the predetermined steam to carbon ratio limit may include 3.

Returning to FIG. 5, in block B17, the fuel gas may be forced to flow through the anode 12 to a fuel exhaust path P5.

In some embodiments, the control method may further include block B18. In block B18, an anode pressure may be maintained higher than a cathode pressure. In one embodiment, maintaining the anode pressure higher than the cathode pressure may include regulating the anode pressure separately so as to maintain the anode pressure higher than the cathode pressure.

Figure 7:
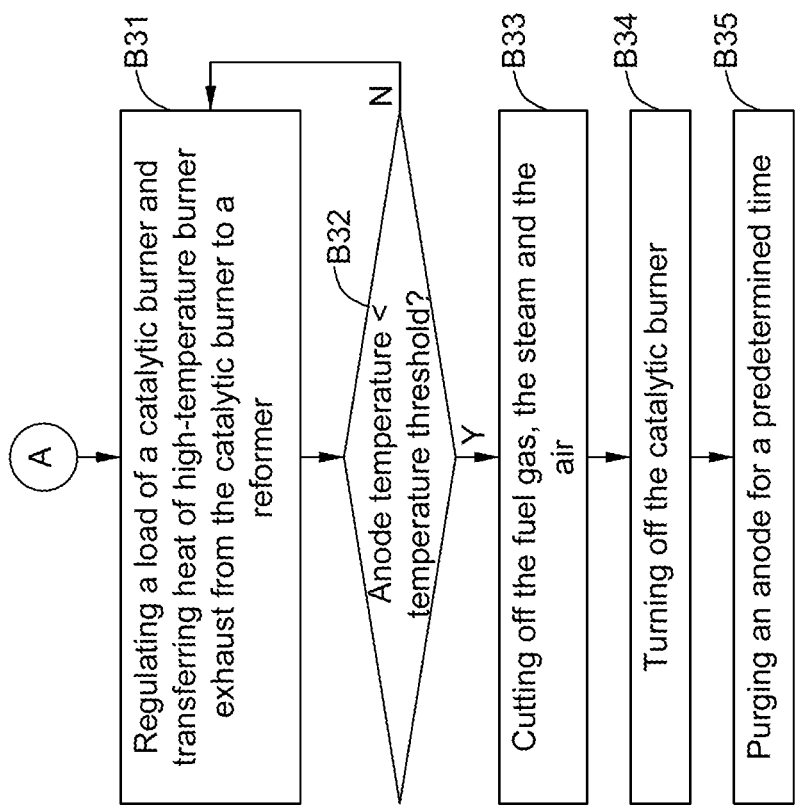
FIG. 7 is a flow chart of the latter part of an exemplary method for controlling a fuel cell system in accordance with an embodiment of the present disclosure.

FIG. 7 illustrates a flow chart of the latter part of an exemplary method for controlling a fuel cell system in accordance with an embodiment of the present disclosure. The control method may further include the following steps.

In block B31 of FIG. 7, a load of a catalytic burner 51 may be regulated and heat of a high-temperature burner exhaust from the catalytic burner 51 is transferred to a reformer 15 of the anode recirculation loop 10 so as to maintain a temperature at a reformer inlet above a predetermined reforming reaction temperature until an anode temperature drops below a temperature threshold at which the oxidation rate of the anode material is negligible. The temperature threshold is for example 350° C.

In block B32, it is determined whether the anode temperature drops below the temperature threshold. When the anode temperature drops below the temperature threshold, the process continues to block B33. Otherwise, the process returns to block B31.

In block B33, when the anode temperature drops below the temperature threshold, the fuel gas, the steam and the air are cut off.

In block B34, when the anode temperature drops below the temperature threshold, the catalytic burner 51 is turned off.

In block B35, when the anode temperature drops below the temperature threshold, the anode 12 is purged by using for example nitrogen ($N_2$) for a predetermined time.

One purpose of purging is to remove the residual water vapor in the anode pipeline while the anode temperature is above 120° C. If the fuel cell system is naturally cooled to below 100° C., the water vapor will become liquid water and stay in the anode pipeline, which is undesirable. Thus, it is required to purge the anode 12 when the water is in the form of vapor or steam. Furthermore, another purpose of purging is to remove the residual fuel exhaust in the anode pipeline. The fuel exhaust may include $H_2$, CO, $CH_4$ and $CO_2$, which are either inflammable, explosive, or toxic. Thus, it is required to remove them by purging from the anode pipeline at low temperatures so that once the fuel cell system cools down, maintenance personnel can work without personal safety issues.

In one embodiment, the purge gas can be $N_2$. In another embodiment, the anode can be purged with a fuel gas (while the anode is at about 150° C.-350° C.) first, and then wait until the low temperature of the anode 12 is not explosive, and then the anode 12 is purged with air.

The control method of the present disclosure may effectively protect the anode 12 of the fuel cell stack 11 from oxidation and prevent cross-over leakage of the fuel cell stack 11 in the event of failure of the anode blower 41, and may thus protect the integrity of the fuel cell stack 11.

While steps of the control method in accordance with embodiments of the present disclosure are illustrated as functional blocks, the order of the blocks and the separation of the steps among the various blocks shown in FIGS. 5-7 are not intended to be limiting. For example, the blocks may be performed in a different order and a step associated with one block may be combined with one or more other blocks or may be sub-divided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A fuel cell system, comprising:
    a fuel cell stack configured for generating power and having an anode and a cathode;
    an anode recirculation loop comprising the anode and having a first path and a second path, wherein the anode is arranged in the second path;
    a fuel supply device for providing a fuel gas via a fuel feed path, wherein during normal operation of the fuel cell system, the fuel feed path and the first path are combined at a combining point to form the second path, and the second path is split into the first path and a fuel exhaust path at a splitting point;
    an air supply device for providing air to the cathode of the fuel cell stack via an air feed path;
    an anode blower located in the anode recirculation loop and configured for driving circulation through the anode recirculation loop;
    a switching element located in at least one of the first path and the combining point, and configured to force the fuel gas to flow through the second path to the fuel exhaust path in the event of failure of the anode blower, and
    a pressure control device to separately regulate an anode pressure to be higher than a cathode pressure.

2. The fuel cell system of claim 1, wherein when a signal of failure of the anode blower is received, the switching element is triggered off and the first path is broken to prevent the fuel gas from flowing through the first path to the fuel exhaust path.

3. The fuel cell system of claim 1, wherein the
    pressure control device maintains the anode pressure higher than the cathode pressure when the fuel cell system is shut down.

4. The fuel cell system of claim 3, wherein the anode recirculation loop further comprises:
    a reformer located in the second path and upstream from the anode.

5. The fuel cell system of claim 4, further comprising:
    a catalytic burner for combusting a fuel exhaust from an anode outlet and an air exhaust from a cathode outlet; and
    a first air heat exchanger and a second air heat exchanger which are sequentially located in the air feed path, wherein the first air heat exchanger is configured for transferring heat from a high-temperature gas to the cold air provided by the air supply device, and the second air heat exchanger is configured for transferring heat of a high-temperature burner exhaust from the catalytic burner to a warm air from an outlet of the first air heat exchanger.

6. The fuel cell system of claim 5, wherein the pressure control device comprises an orifice, and the orifice is located downstream from the first air heat exchanger.

7. The fuel cell system of claim 5, wherein the high temperature gas comprises a gas from an outlet of the second air heat exchanger.

8. The fuel cell system of claim 5, further comprising:
    an anode heat exchanger configured for transferring heat of the high-temperature burner exhaust from the catalytic burner to the reformer, wherein the high temperature gas comprises a gas from an outlet of the anode heat exchanger.

9. The fuel cell system of claim 8, wherein the fuel cell stack, the reformer, the catalytic burner, the second air heat exchanger and the anode heat exchanger are sealed in a hotbox.

10. The fuel cell system of claim 1, wherein the pressure control device comprises an anode pressure control valve.

11. The fuel cell system of claim 10, further comprising:
    a catalytic burner for combusting a fuel exhaust from an anode outlet and an air exhaust from a cathode outlet, wherein the anode pressure control valve is located between the splitting point and the catalytic burner.

12. The fuel cell system of claim 11, wherein the fuel cell stack, the reformer and the catalytic burner is sealed in a hotbox, and the anode pressure control valve is located after the splitting point and before the hotbox.

13. The fuel cell system of claim 1, wherein the switching element comprises a check valve, a solenoid valve, a fail-safe three-way valve, or a combination thereof.

14. A method for controlling a fuel cell system, wherein the fuel cell system comprises a fuel cell stack configured for generating power and having an anode and a cathode, and an anode recirculation loop comprising the anode, the method comprising:
    supplying a fuel gas to the anode recirculation loop by driving of an anode blower;
    supplying air to the cathode of the fuel cell stack;
    monitoring health status of the anode blower;
    initiating a shutdown procedure of the fuel cell system when a signal of failure of the anode blower is received;
    regulating an anode pressure separately so as to maintain the anode pressure higher than a cathode pressure; and
    forcing the fuel gas to flow through the anode to a fuel exhaust path.

15. The method of claim 14, further comprising: supplying steam to the anode recirculation loop, wherein initiating the shutdown procedure of the fuel cell system comprises:
    cutting off a power load of the fuel cell stack;
    setting an air flowrate of the air provided to the cathode of the fuel cell stack at a predetermined air flowrate value; and
    setting a fuel flowrate of the fuel gas and a steam flowrate of the steam provided to the anode recirculation loop at a predetermined fuel flowrate value and a predetermined steam flowrate respectively to avoid carbon deposition.

16. The method of claim 15, wherein the anode recirculation loop further comprises a reformer located upstream from the anode and the fuel cell system comprises a catalytic burner for combusting a fuel exhaust from an anode outlet and an air exhaust from a cathode outlet, and the method further comprises:
    regulating a load of the catalytic burner and transferring heat of a high-temperature burner exhaust from the catalytic burner to the reformer so as to maintain a temperature at a reformer inlet above a predetermined reforming reaction temperature until an anode temperature drops below a temperature threshold at which the oxidation rate of the anode material is negligible.

17. The method of claim 16, further comprising:
    cutting off the fuel gas, the steam and the air, and turning off the catalytic burner when the anode temperature drops below the temperature threshold.

18. The method of claim 16, further comprising:
purging the anode for a predetermined time when the anode temperature drops below the temperature threshold.

\* \* \* \* \*